219-121.
11-27-73    OR    3,775,581

United States Patent [19]
Sciaky

[11] 3,775,581
[45] Nov. 27, 1973

[54] SEAM TRACKING METHOD

[75] Inventor: Albert M. Sciaky, Palos Park, Ill.

[73] Assignee: Welding Research, Inc., Chicago, Ill.

[22] Filed: June 23, 1971

[21] Appl. No.: 155,790

[52] U.S. Cl. .................... 219/121 EM, 219/125 PL
[51] Int. Cl. ............................................. B23k 15/00
[58] Field of Search ............... 219/121 EB, 121 ER, 219/121 R, 125 PL, 125 R; 250/49.5 TE, 49.5 R

[56] References Cited
UNITED STATES PATENTS

| | | | |
|---|---|---|---|
| 3,408,474 | 10/1968 | Downing | 219/121 EB |
| 3,426,174 | 2/1969 | Graham et al. | 219/121 EM |
| 3,513,285 | 5/1970 | Imura | 219/121 EM |
| 3,535,488 | 10/1970 | Kitchin | 219/121 EM |
| 3,204,081 | 8/1965 | Iceland | 219/121 EM |
| R27,005 | 12/1970 | Wingfield et al. | 219/121 EM |
| 3,393,370 | 7/1968 | Bauer | 328/187 |

Primary Examiner—R. F. Staubly
Assistant Examiner—Gale R. Peterson
Attorney—Julius L. Solomon

[57] ABSTRACT

There is herein disclosed a method for controlling the motion of an electron beam gun with respect to a work piece so that the electron beam will follow the path along the seam between the two parts which are to be welded. Means are provided for maintaining a fixed tangential velocity along the path. Control of the motion is achieved from signals derived as the seam is scanned by the circular motion of the electron beam in the area including the seam. These signals are in the form of pulses generated by the reduction in secondary and reflected electrons as the electron beam traverses the seam. These pulses bear a phase relationship to a reference sinosoid and are processed in the control so as to provide the sine and co-sine of the angle the path takes with respect to a reference axis. From the sine and co-sine terms the X and Y motion components are derived and fed to servo operators which drive the gun with respect to the work along the two mutually perpendicular axes so that the gun motion is always tangential to the path at a desired fixed velocity.

Means are provided for countering the effect of extraneous noise pulses and for supplying substituted pulses for weak or missing pulses.

6 Claims, 33 Drawing Figures

INVENTOR.
ALBERT M. SCIAKY
BY
Julius L. Solomon

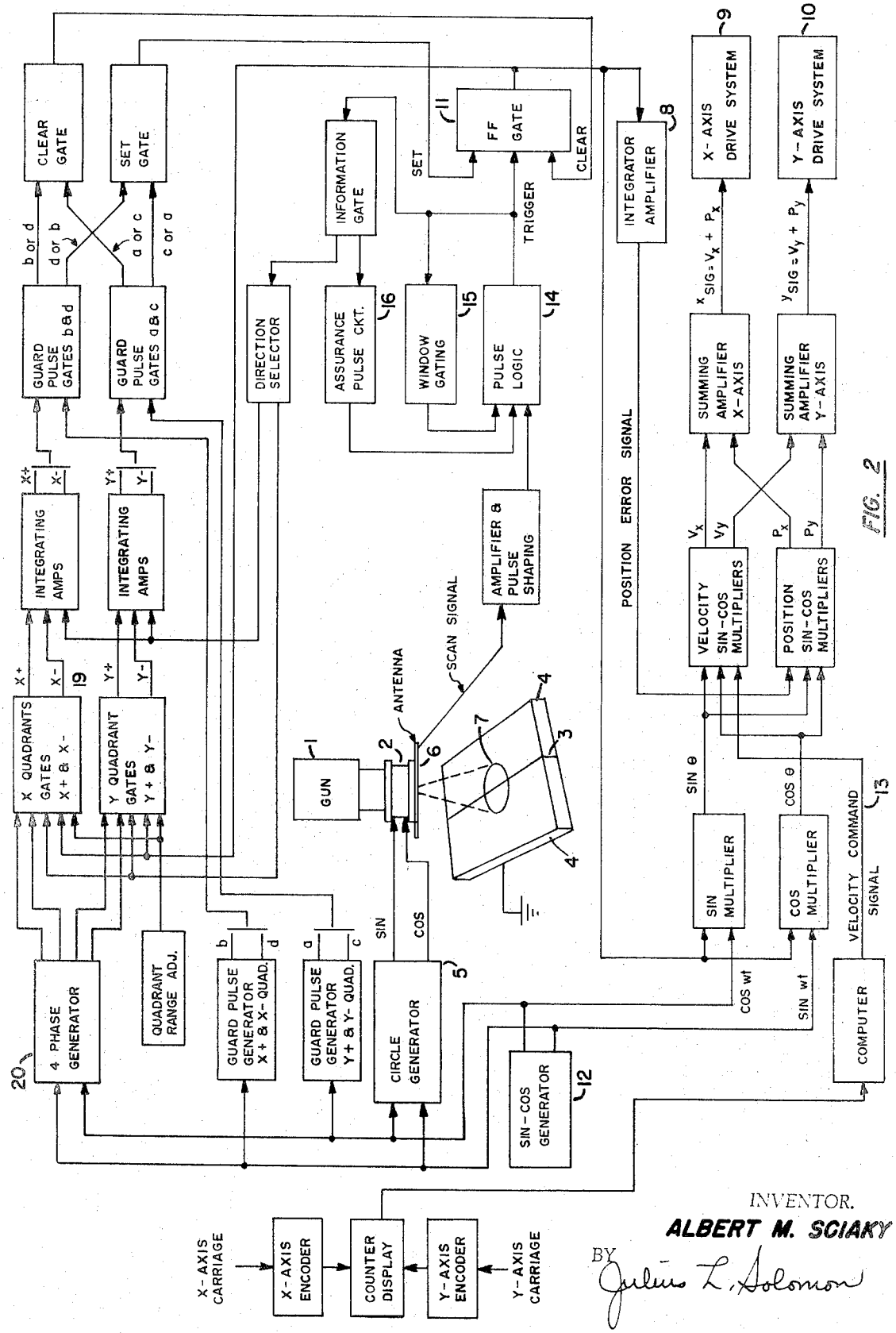

INVENTOR.
ALBERT M. SCIAKY
BY
Julius L. Solomon

| FOR DIRECTION | X+ | Y+ | X- | Y- |
|---|---|---|---|---|
| GUARD PULSE TO SET b | | c | d | a |
| GUARD PULSE TO CLEAR d | a | b | c | |

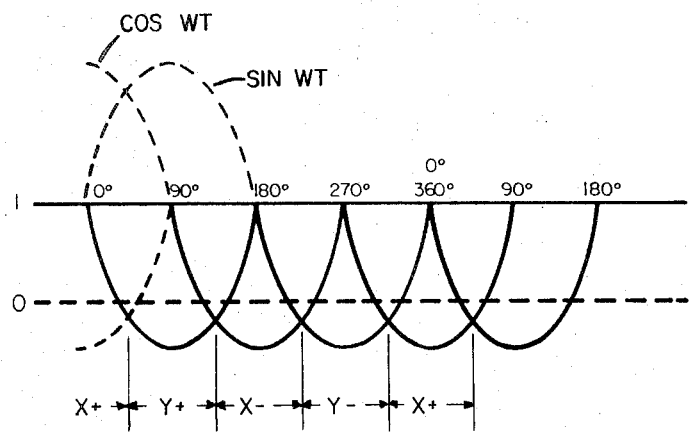
4 PHASE SIGNALS AT QUADRANT GATES
*FIG. 8a*
INF PULSE AT 30°
*FIG. 8b*
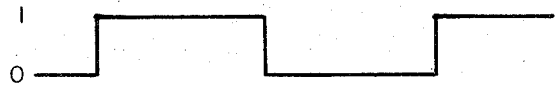
FF OUTPUT SIGNAL
*FIG. 8c*
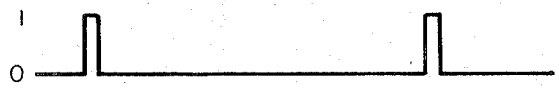
X+ QUADRANT GATE OUTPUT
*FIG. 8d*
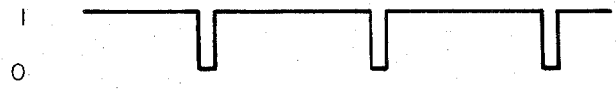
INF PULSE AT 150°
*FIG. 8e*
FF OUTPUT SIGNAL
*FIG. 8f*
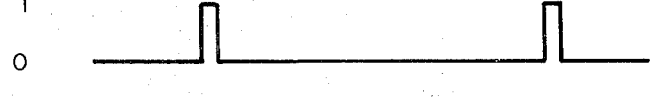
X- QUADRANT GATE OUTPUT
*FIG. 8g*
*FIG. 8*
INVENTOR.
ALBERT M. SCIAKY
BY
Julius L. Solomon

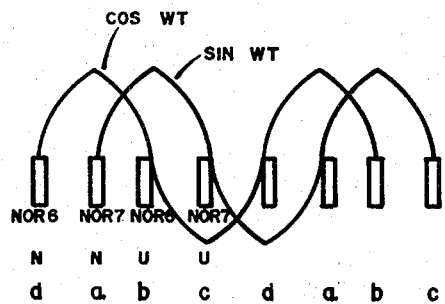
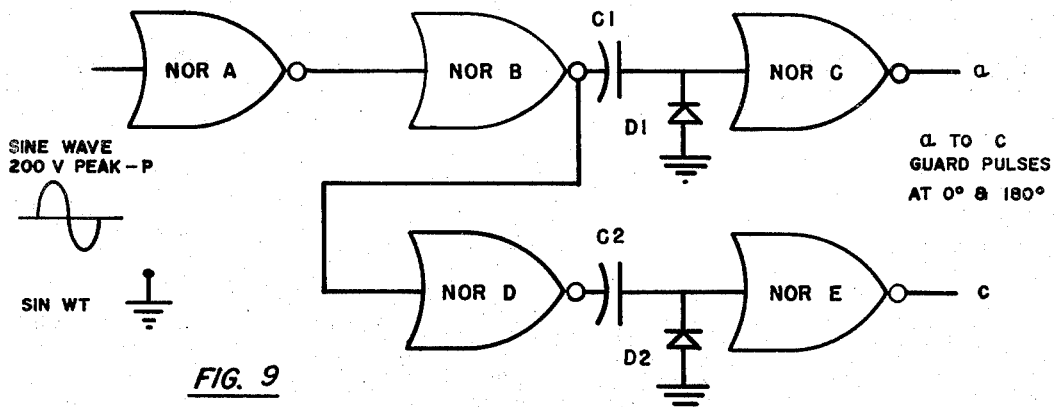
FIG. 9
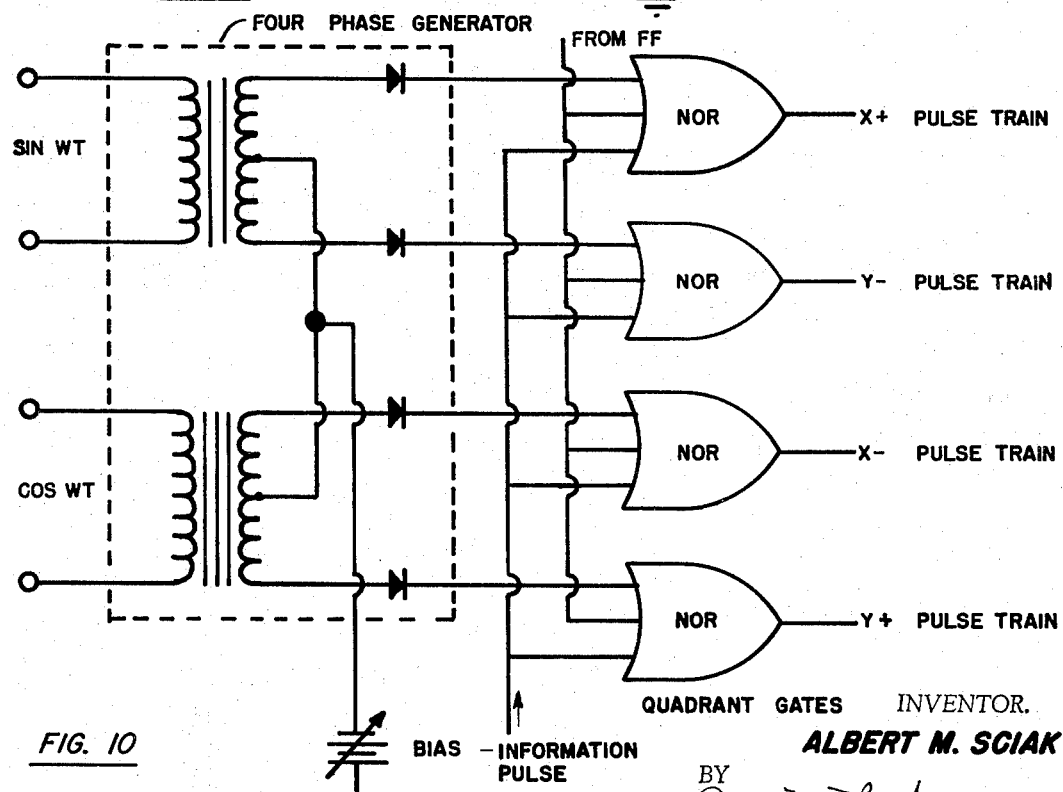
FIG. 10
INVENTOR.
ALBERT M. SCIAKY
BY

SEAM TRACKING METHOD

This invention is related generally to electron beam welding apparatus and, more specifically, to a method and apparatus for use in an electron beam welding system which provides means for automatically causing the electron beam to follow any path on the work along which it is desired that the beam impinge so as to produce a continuous weld along that line. In a typical electron beam welding machine the relative motion between the work and the gun may be effected in at least two ways. In one method the gun is fixed and the work is mounted upon a carriage which may be driven simultaneously along two mutually perpendicular axes with separate driving means for the X- and Y-axes so that the relative motion between the gun and the work may be made to follow a straight line or a curved path. A second and more practical method is to use a gun which is movable within the chamber and may be driven along one of the axes while the carriage is provided with a drive which moves the carriage back and forth along the second axis. In electron beam welding, the edges of the two parts which are to be welded together are formed so that they adjoin with as little gap between the parts as is practically obtainable. If the seam is along a straight line the work is lined up so that it is parallel to the direction of motion of the carriage, the electron beam positioned so that the beam strikes the work at one end of the seam, and the carriage then set into motion so that the beam strikes the work progressively along the full length of the seam while moving at a preset velocity. If the seam path is not a straight line, then the work may be moved in relation to the electron gun by manual manipulation of the means for positioning the gun with respect to the work. This procedure, however, requires great skill and much practice and can only be utilized when the desired welding speed is extremely low. Furthermore, it is not likely that the tangential speed of the electron beam with respect to the work could be maintained constant by manual manipulation of the X- and Y-axes carriage operators. Systems have been devised in the past for tracking a seam but, if purely mechanical, they require special preparation of the parts so as to form a groove at the top of the seam into which a mechanical finger may be placed, or, if an optical method is utilized, a stripe of either black or white paint must be painted parallel and close to the seam to be welded. However one disadvantage of this is that the paint contaminates and causes defects in the weld.

The present invention has for its primary object the provision of a method and apparatus by which an electron beam gun will follow the seam between two adjoining work pieces which are to be welded.

Another object is to maintain the position of the beam upon the seam with very close tolerances so that the electron beam is centered over the seam with a deviation of less than five-thousandths of an inch.

Another object is to provide a method and apparatus by which the tangential velocity of the electron beam with respect to the seam is maintained constant at a pre-set magnitude along the full length of the seam. Another object of the invention is to provide a means whereby incremental positions of the beam with respect to the seam may be recorded in a numerical control memory, be it punched or magnetic tape or magnetic drum, and processed in an associated computer so as to provide control signals to the X- and Y-axis driving means on a machine which will position the gun properly along the path to a preset tolerance and cause the gun to move with respect to the seam at a fixed preset tangential velocity.

Another object of the invention is to provide a method and apparatus whereby any deviation of the beam from the seam is immediately corrected.

Another object of the invention is to provide a method and apparatus whereby an electron beam is caused to follow a path having any possible configuration at the point of its impact upon the work pieces to be welded. The path may be a straight line, a circle, a square, an ellipse, or any variation or combination of these.

The apparatus utilized for practicing the method of the invention consists of well-known control elements which are arranged in the overall control so as to perform the desired functions. These elements include the well-known logic functions known as NOR, OR and AND functions, bi-stable flip-flop gates, amplifiers, pulse shapers, integrating amplifiers, summing amplifiers, multipliers, various combinations of NOR, OR and AND circuits which form gating systems for signals or pulses, and bi-directional servo systems which control the speed and direction of a motor as a function of the polarity and magnitude of DC signals which are fed to their input circuits. The structure and operation of some of these elements will now be explained in order that the method and operation of the overall system may more readily be understood.

To illustrate the method utilized we may refer to the following figures.

FIG. 2 is a block diagram illustrating steps of the method of control of the invention.

FIG. 5 to 5e are graphs illustrating the multiplication of the output of the flip-flop by the sine $\omega t$ and co-sine $\omega t$ signals from the circle generator in order to obtain the cos and sine respectively of the angle taken by the seam with respect to the reference axis.

FIG. 6 to 6e are graphs of the relationship between pulses in the pulse assurance circuit which generates signals in order to prevent a misoperation due to electrical noise or missing position information.

Figure 7:
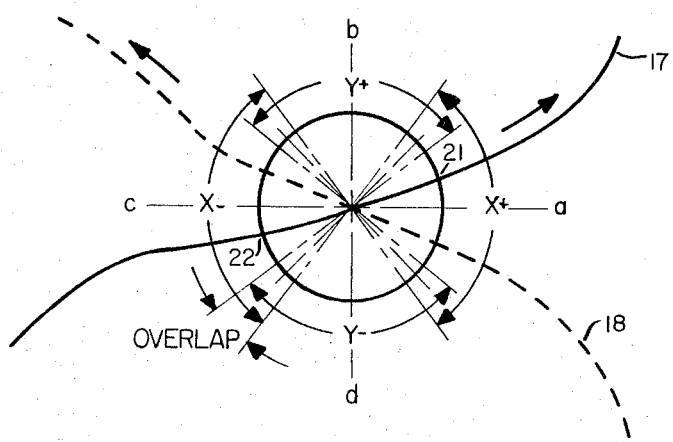

FIG. 7 illustrates the relative position between the reference coordinates X and Y and certain information generated in the control apparatus which has the function of countering the effect of noise which could reverse the direction of travel when it is not desired and to retain the sense of direction when scanning pulses disappear for short periods of time due to local conditions along the seam being tracked.

FIG. 8a to g shows the relationship of the signal applied to the quadrant gates when the electron beam first crosses the seam in the X+ or the X− quadrant and the output signals from the X+ and X− quadrant gates.

FIG. 9 illustrates logic for generating the guard pulses.

FIG. 10 illustrates the logic system for determining the quadrant in which the beam first crosses the seam during each rotation of the beam.

LOGIC CIRCUITS

Figure 1A:
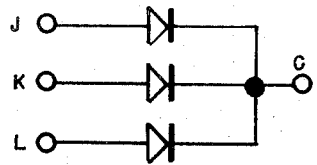
FIG. 1a to 1f are schematic and symbolic drawings of logic circuits used in the control system of the invention.
Figure 1B:
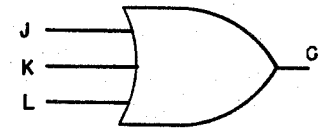
Figure 1C:
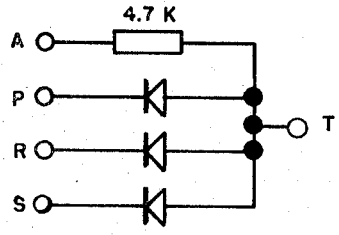
Figure 1D:
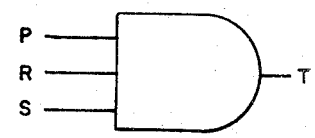

A typical OR circuit is illustrated schematically at FIG. 1a and symbolically at FIG. 1b. A typical AND circuit is illustrated in FIG. 1c schematically and FIG. 1d symbolically and a typical NOR circuit is shown schematically in FIG. 1e and symbolically in FIG. 1f. A multiplicity of the above logic elements is used as building blocks in the overall control system. Each of the building block circuits can be viewed as a two value element or circuit having either zeros or ones at its input or output terminals. The one value is considered as the full supply voltage, in most cases about plus 20 volts DC with respect to ground, and a zero value is considered as zero or some value near zero volts with respect to the ground. Referring now to the OR schematic shown in FIG. 1a, the application of a positive potential of 20 volts at any of the inputs J, K or L, will result in the appearance of a 20 volt signal at output terminal C. Since the 20 volt input signal is designated by a 1 we may say that the application of a 1 to any of the inputs of the OR will result in an output of 1 across the load which is connected between the output terminal C and the ground.

Figure 1E:
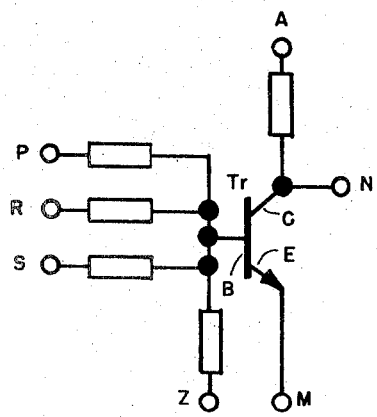
Figure 1F:
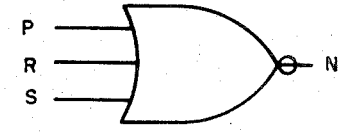

The AND gate illustrated in FIG. 1c is connected at its A terminal to a plus 20 volt power supply. A zero applied to any one of the P, R, and S input terminals will result in a flow of current through the associated diode and thus bring the output terminal T close to the ground potential or zero value. When the input terminals P and R and S are all brought to a plus 20 potential the diodes will cease conducting and the output terminal T will be brought to the potential of the power supply, 20 volts positive with respect to ground, which is the 1 value. In other words, when all the inputs are at 1, the output T will be at 1. When any of the inputs are at zero, the output will be at zero. The NOR gate illustrated in FIG. 1e is connected at its A terminal to the plus 20 volt power source and at its Z terminal to a negative 20 volt supply. When the input terminals P, R and S are supplied with a zero the transistor which is negatively biased by the minus 20 volts between terminal Z and the ground will be at cut off and there will be no collector-emitter current flowing so that the potential of the output terminal will be at the same potential as the plus 20 volts power supply connected to terminal A. If any of the input terminals are supplied with a plus 20 volt potential, base-emitter current will flow, the transistor will pass collector to emitter current to saturation and the potential between the output terminal N and ground will be the low voltage drop across the transistor junction which is designated a zero. In other words, a 1 at any of the input terminals P, R and S results in a zero at the output terminal N. Zero inputs to all of the input terminals P, R and S will result in a 1 output at N.

SEAM DETECTION

In association with the above mentioned control method and circuitry, a method of seam detection described in Pat. application No. 784,574 now U.S. Pat. No. 3,609,288 is utilized. In the latter method an electron beam is oscillated across the seam and secondary and reflected electrons resulting from the electron beam striking the work are collected and used to indicate the relative position of the beam with respect to the seam. There is a sharp drop in the secondary electron emission whenever the beam crosses the seam which results in a negative going pulse of secondary electron current.

In the present invention the seam is tracked through the use of an electron beam of low power density which is used to scan the seam while it traverses a circular path which crosses the seam. Each time the beam crosses the seam a pulse is generated whose angular position along the circuit path marked out by the beam on the work may be determined with reference to a set of X- and Y-coordinates whose axis is at the center of the circle swept out by the electron beam. The signals derived are processed electronically in order to derive the sine and cosine of the angle between the X-axis and the position in the circular sweep where the beam crosses the seam. Should the center of the swept circle be shifted from the seam a position error signal is generated which acts upon servo amplifiers which drive the gun and the work with respect to each other along two axes which are mutually perpendicular producing a resultant motion normal to the direction of the seam. The position error signal acts continuously to maintain the rest position of the beam on the seam at all times. The sine and co-sine of the angle of path direction with respect to the X-coordinate reference are utilized to produce the X- and Y-axis component of the desired relative velocity along the seam, so as to result in a constant velocity of the gun with respect to the work along the desired path.

POSITION ERROR DETECTION

We refer now to FIG. 2 which is the block diagram illustrating the overall method. The electron gun 1 which incorporates an electron beam generating and focussing system and a beam deflection means, either electrostatic or electromagnetic, 2, is caused to generate an electron beam of low power density by adjusting its accelerating potential to 60,000 kilovolts, for example, and its beam current to one or two milliamperes.

Figure 3:
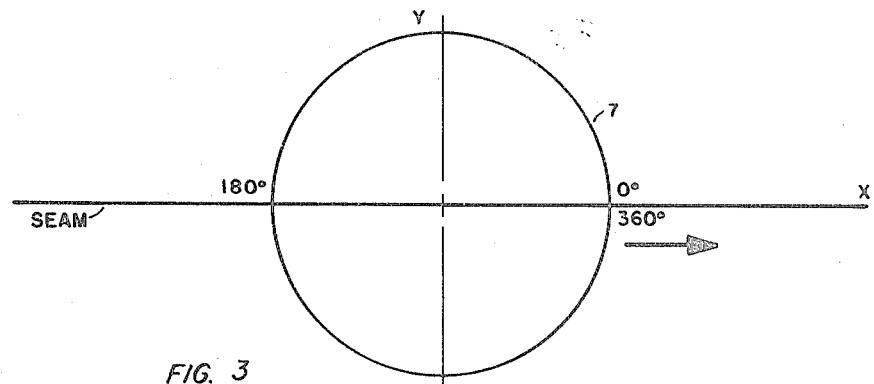
FIG. 3, 3a and 3b illustrate the form and phase relationship of signals generated in the control system when the electron beam is centered on the seam.
Figure 3A:
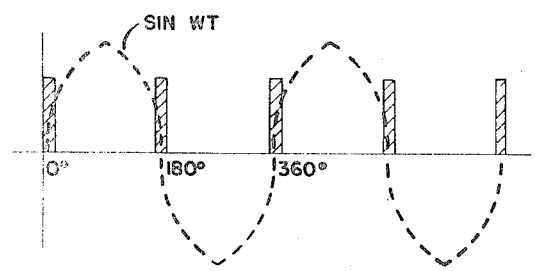
Figure 4:
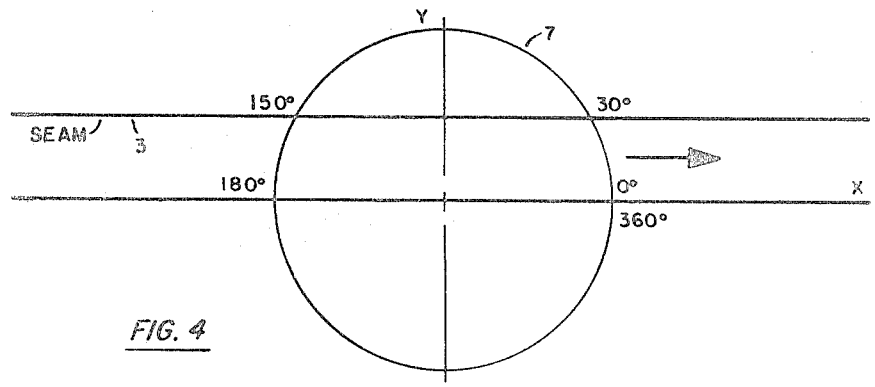
FIG. 4, 4a and 4b illustrate the form and phase relationship of signals generated in the control system when the electron beam is offset from the seam.
Figure 4A:
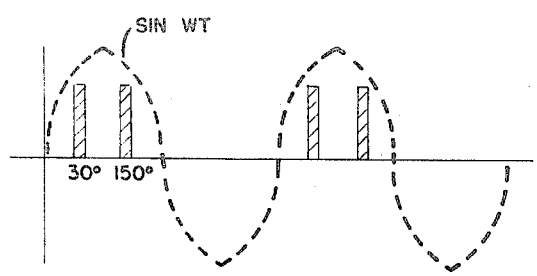

The beam is directed towards the seam 3 between the adjoining work pieces 4. The deflection arrangement (2) which includes means for deflecting the beam along two mutually perpendicular axis which are at right angles to the undeflected path of the beam, is fed from a circle generator 5 in which are generated sine and cosine periodic wave form currents which, when fed to the X- and Y-axis deflection coils, respectively, cause the beam to travel in a circular path — the diameter of the path on the work pieces being determined by the distance from gun to the work and by the magnitude of the periodic sine and co-sine wave form current passing through the respective deflection coils. As the beam travels along its circular path, secondary and reflected electrons will be generated at the point where the electron beam strikes the work. Secondary electrons will be collected by the antenna 6 which is mounted below the focus coil and insulated therefrom and a current will be developed from the secondary electrons which have been collected as is explained in my application No. 784,574, now U.S. Pat. No. 3,609,288. Each time the electron beam traverses the leading edge of the seam between the two parts a pulse will be generated due to the sudden reduction in reflected signal picked up by the antenna. If the circular path of the beam is centered on the seam as in FIG. 3, two pulses 180° apart will be generated for each revolution of the beam, as shown in FIG. 3a. If the work is now moved in relation to the gun along the seam in such a way that the circle is always centered or the seam which indicates that with the beam at rest it would strike the seam as is desired, the pulses generated would all be an equal distance from each other at 180°. When viewed on a cathode ray oscilloscope a pattern would appear as in FIG. 3a of a series of pulses equidistant from each other. Should the beam move in a direction which is transverse to the seam the circular path will not be centered on the seam as shown in FIG. 4 and the pulses on the cathode ray display would then not be equidistant but would alternate in distance from each other as in FIG. 4a. FIG. 3 illustrates the path 7 of the rotating beam upon the work. The beam is rotating counterclockwise about the origin of the coordinates X and Y and the gun is moving in the direction of the arrow with respect to the work so that the X axis lies along the seam. The beam strikes the leading edge of the seam at zero degrees and again at 180°, again at 360°, etc. FIG. 4 illustrates the condition when the gun is offset for some distance in a direction at right angles to the seam. In this case a pulse will ge generated not at zero degrees but at 30° and again at 150° and this will be repated as long as the beam is rotated at that point or moved along a path parallel to the seam.

Figure 3B:
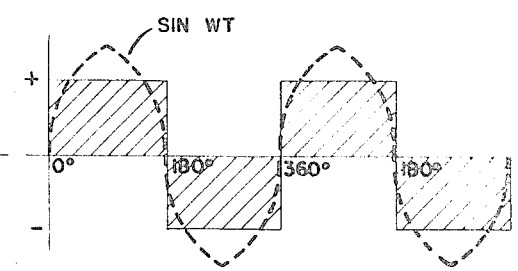
Figure 4B:
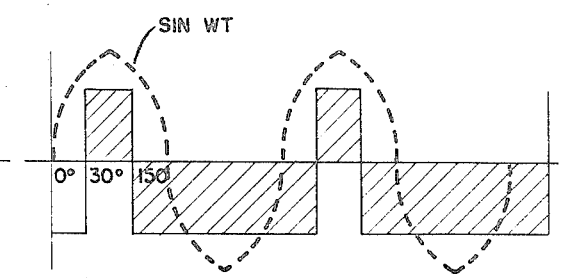
Figure 5:
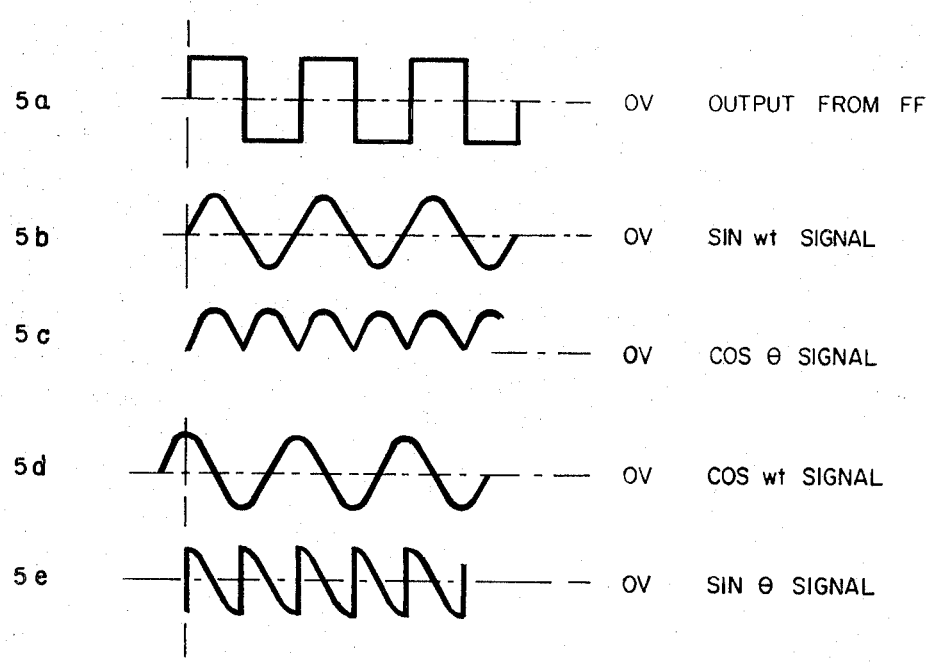

One purpose of the method of this invention is to maintain the electron beam centered about the seam along the desired path along the seam. The relative position of the pulses generated as explained above is utilized to determine the magnitude and direction of the position error, that is the displacement of the center of the beam with respect to the seam, should the electron gun stray from the desired path, and is utilized to control the servo amplifiers which direct the motion of the X- and Y-axes drive systems for displacing the gun with respect to the work so as to bring the center of the beam back to the seam. The position error is determined in the following manner. Each pulse generated, after amplification and shaping by suitable electronic circuitry, is delivered to a flip-flop gating system whose state changes from 1 to 0 or from 0 to 1 with each pulse delivered to its trigger circuit. As a result, a pattern will appear at the output of the flip-flop gate as shown in FIG. 3b and 4b. FIG. 3b illustrates the output pattern resulting from the condition as shown in FIG. 3a and FIG. 4b illustrates the voltage pattern which will result from the condition illustrated in FIG. 4. The signals emanating from the flip-flop gate are integrated in the integrating amplifier 8 and it can be readily seen that the integration of wave form 3b would result in zero signal whereas the integration of the wave form 4b would result in a negative output voltage. It can readily be seen that had the gun been displaced in the opposite direction from that shown in 4 that pattern 4b would be flipped over and that the resulting indication would be a positive position error voltage. These position error signals are delivered to the X- and Y-axis drive systems and cause the drive to move the gun or work in the proper direction so as to correct for the error and bring the beam directly over the seam. Note that the motion does not contribute a component of velocity along the seam.

DETERMINATION AND SEPARATION OF VELOCITY COMPONENTS

A second purpose for the method of the invention is to direct the motion of the gun with respect to the work so that the tangential velocity remains constant along the desired path, which may take any form depending upon the shape of the seam between the two parts. This path may be circular, eliptical or square in those cases where it is necessary to weld inserts into plates. The electron gun is moved with respect to the work by means of two drive systems 9 and 10 which drive the gun with respect to the work along axes which are mutually perpendicular. The desired direction of motion must therefore be broken down into X- and Y-components at right angles to each other which will result in a desired constant tangential velocity along the desired path. This is accomplished by the following method:

The output signal from the flip-flop gate 11 is multiplied by the sine $\omega t$ and the cosine $\omega t$ of the periodic voltages which are fed from the sine-cosine generator 12 to the deflection coils 2 to generate the circular motion 7 of the beam. If we consider the case where the beam is oriented as indicated in FIG. 3 which would result in a square wave output from the flip-flop which is in phase with sine $\omega t$, as in 3b, we will find that the product of the output from the flip-flop and the sine $\omega t$ voltage results in a voltage having the wave form shown in 5c which, when integrated, will produce a maximum voltage output to which we may assign the level 1. This output will be proportional to the cosine of $\theta$, theta being the angle between the X-axis of the rotating beam and the actual direction of the seam at that point. We also find that the multiplication of the output wave form from the flip-flop by cosine $\omega t$ of the current feeding the deflection coils results in a wave form as illustrated in 5e which, when integrated, produces an output voltage of magnitude 0 which is the sine of 0°. This multiplication produces a signal which is proportional to the sine of the angle between the X-axis of the rotating beam and the direction of the seam. If we multiply the analog of the desired velocity by these analog voltages of the cosine $\theta$ and sine $\theta$, respectively, we will obtain two voltages, one being the analog of the velocity component along the X-axis obtained by multiplying the desired velocity command signal by the cosine $\theta$, and the second the Y-component of velocity obtained by multiplying the desired velocity command signal by the sine of $\theta$. These signals control the velocity respectively of the X-axis drive system 9 and the Y-axis drive system 10 so that the gun 1 is moved with respect to the work 4 along the desired path 3 at the desired velocity, as preset by the velocity command signal 13. The system as described above will deliver the signals of the proper magnitude and sign so that the beam is kept on the seam at all times and so that the motion of the electron gun with respect to the work is in the proper direction along the seam and at the desired tangential velocity. Should an extraneous pulse, such as electrical noise, cause the flip-flop gate to switch at a point where the beam is not traversing the seam, or if a proper pulse is not generated at the time the beam does traverse the seam, the output signals from the flip-flop gate will be switched in phase relationship with the sine $\omega t$ and cosine $\omega t$, the fixed signals driving the circle generator, with the result that the voltages fed to the X- and Y- axes drive systems will be reversed in polarity so that the drives will move in a direction opposite to that desired.

ASSURANCE PULSE SYSTEM

Figure 6:
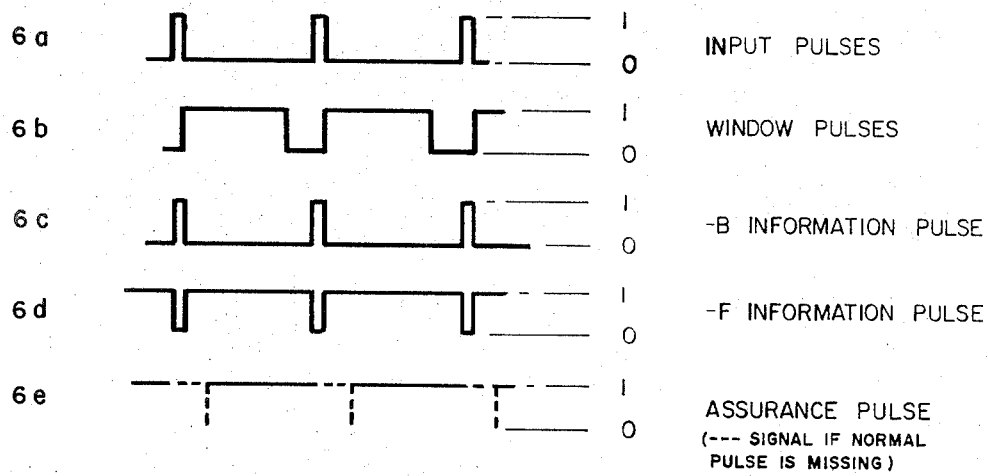

In order to prevent this type of action a means for allowing information pulses to be fed to the flip-flop gate only during a short interval in each half cycle and a means for supplying any missing pulses have been incorporated in the overall method. The method by which this is accomplished may best be understood by referring to FIG. 6 which illustrates the action in the window gating and pulse assurance systems. FIG. 6a illustrates a train of pulses which are derived from the scanning of the seam by the beam as they appear after amplification and shaping. These pulses are fed to the window gating system which applies the signal illustrated in 6b to the pulse logic circuit 14 interposed between the pulse amplification and shaping means and the flip-flop gate. During the period represented by the upper portion on the graph of window pulses 6b, a period of approximately 5 milliseconds, any noise pulses which may be generated are prevented from producing a trigger pulse which would trip the flip-flop gate 11. The window gate 15 is maintained open for a period of approximately 3 milliseconds following the closed gate period. If an information pulse from the train illustrated in 6c arrives while the window gate is open, a trigger pulse will be generated which will properly cause the flip-flop gate 11 to change its state. Should an information pulse be missing the window gate will remain open and an assurance pulse, which is generated in the assurance pulse circuit 16 10 milliseconds after each trigger pulse is generated, will be delivered to the pulse logic 14 and generate a trigger pulse which will switch the flip-flop gate 11 in order to keep it in the proper phase relationship with sine $\omega t$. The above described method of supplying assurance pulses will allow the system to maintain its sense of direction even though an occasional pulse is missing. In order for the control system to retain its sense of direction when scanning pulses disappear entirely for short periods of time, a guard pulse gate system is utilized which functions as follows.

DIRECTION DISCRIMINATION

The Guard Pulse Gate System is a system for determining the direction that the gun is taking with respect to a pre-established reference system and insuring that the gun follows the path smoothly once it is started in a particular direction. The circle described by the rotating beam mentioned previously, is divided into four quadrants which overlap slightly. Taking the sine $\omega t$ of the circle generator as a reference the quadrant from approximately $-50°$ to $+50°$ is designated as X+. The adjacent quadrant in the counterclockwise direction from 40° to 140° is designated Y+ and the following quadrants designated X— and Y—, respectively, each covering 90° plus an overlap, as is indicated in FIG. 7. On this figure are shown two possible paths indicating the seam to be welded and along which the electron beam gun therefore is to move. The path indicated by the solid line 17 along which the gun is to move in the direction indicated by the arrow will be crossed by the rotating beam after approximately 30° of counterclockwise rotation from the zero degree reference line along the X-axis. As the beam strikes the seam an information pulse shown in FIG. 8b will be generated which is negative going and as the pulse returns to the quiesent state 1 the flip-flop which has been at zero will switch to 1. The broken line 18 indicated on FIG. 7 indicates a seam which is to be traversed by the gun in the direction indicated by the arrow alongside. The beam, upon striking the seam during its counterclockwise travel, will generate a pulse which is indicated in FIG. 8e. The first of the aforesaid pulses was generated in the X+ quadrant and the second of the pulses was generated in the X— quadrant. In order to sense the quadrant in which a pulse may be generated the four quadrant gates 19 designated X+, Y+, X— and Y—, are utilized. The four quadrant gates FIG. 10 are opened sequentially in step with the rotating beam as it traverses these imaginary quadrants during its travel. Each quadrant gate consists of a NOR gate whose output is zero if any one of its three inputs has a positive voltage applied to it. When all three inputs are simultaneously brought to zero the NOR gate will have an output of 1. The four phase generator 20 on the block diagram and shown schematically in FIG. 10, delivers voltages shown in FIG. 8a to each quadrant gate which holds one input negative in turn on each gate, the X+ quadrant gate remaining open during the period that the beam is traversing the X quadrant, the Y+ quadrant gate remaining open only during the period the beam traverses the Y+ quadrant, and so on for the X— and the Y— gates, in turn. If, while one of the NOR quadrant gates is held negative at one of its inputs and the flip-flop is delivering a zero to the gates, as in FIG. 8c, and an information pulse arrives at the gate, the quadrant gate which already had two of its inputs at 0 will deliver a 1 pulse at its output. In the case of the beam when it crosses the point 21 on the seam there will be a pulse output from the X+ quadrant gate, FIG. 8d, which will be delivered to an integrating amplifier which, after integrating several pulses, will open the guard pulse gate system which will allow a b guard pulse to be delivered to the clear gate which will deliver a pulse to the FF gate which will clear it so as to insure that it is in the proper position for the next oncoming pulse which is generated when the beam traverses the seam at the point 22. The guard pulses mentioned above are produced in a guard pulse generator FIG. 9 which produces four separate pulses designated a, b, c, and d, the a pulse being generated as the sine $\omega t$ wave passes through 0, the b guard pulse generated at 90°, the c guard pulse generated at 180° and the d guard pulse generated at 270°.

FIG. 9 is the symbolic logic circuit for a system which may be utilized to generate these guard pulses. The system shown is for the generation of guard pulses a and c which are separated from each other by 180° with reference to the sine $\omega t$ voltage wave. The system comprises five NOR circuits connected as shown. In the quiescent state the output of NOR c and e will be at 1 inasmuch as the inputs of both NORS are at zero. When a sine wave having a peak to peak magnitude of 200 volts is applied across the input terminal of NOR A and the ground, NOR A whose output is 1 when its input is 0 will shift its output to 0 as the positive going sine wave applied to its input passes through zero. The output of NOR B will go to 1, capacitor C1 will charge quickly through the input resistance in the NOR C circuit and NOR C during the charging period will produce a negative going output pulse. Since the NOR b output which is delivered to NOR D is a 1 the output of D will be zero and the output of NOR E will remain at 1. As the positive half cycle of the sine wave is approaching zero NOR A output will become 1, NOR B output will become zero, NOR C output will remain at 1, NOR D being fed by a zero from B will go to an output of 1 and as C2 charges the charging current will saturate the transistor in NOR E so that it delivers a negative going pulse to zero for a short interval of time. We thus have generated a negative going output pulse at NOR C at zero degrees of the sine $\omega t$ voltage wave and a negative going output pulse at NOR E when the sine $\omega t$ is approaching 180° thus generating guard pulses $a$ and $c$ at zero degrees and 180° as indicated in FIG. 7. Guard pulses $d$ and $b$ are generated by applying to a similar circuit an input voltage of cosine $\omega t$ having a peak to peak magnitude of 200 volts. In the above manner the four separate negative going guard pulses are generated each appearing with respect to the ground at the output terminals of its NOR circuit.

When the leading edge of the seam is in the X+ quadrant, the X+ integrating amplifier maintains a zero input at the B and D guard pulse NOR gates. At the instant the rotating beam traverses the 90° position in the adjacent Y+ quadrant, the $b$ quard pulse will be generated, pass the guard pulse gate, and will be directed through the clear OR gate to the flip-flop gate and force the FF gate to the clear position. As the beam continues in its counterclockwise motion it passes the seam at the point 22 at which point an information pulse is generated which switches the flip-flop to the set side. As the beam passes the 270° point in the Y− quadrant, a $d$ pulse is generated which is gated through the guard pulse gate, through the set gate, to the flip-flop gate so as to force the FF gate to the set side in the event that the flip-flop gate has been triggered by noise and switched from the set to the clear during the period between the point 22 position and the 270° position, or, in the event that the pulse which should have been generated at the point 22 was not generated.

A similar action and generation of guard pulses occurs if the gun travel is in the X− quadrant, as indicated by the broken line in FIG. 7. In this case a $d$ guard pulse will be allowed through the clear gate and deliver a pulse to the clear side of the flip-flop gate at the moment the beam passes through the 270° position and a $b$ pulse will be directed through the set gate to the flip-flop gate in order to maintain it in the set state when the rotating beam passes through the 90° point. This will maintain the flip-flop gate properly synchronized with the position of the beam in its circular travel so as to maintain the motion of the electron beam gun in the proper direction along the seam.

The above described system will generate signals which, when fed to their respective X-axis and Y-axis drive systems, cause the electron beam gun to faithfully follow the seam to be welded. By installing X- and Y- axis encoders on the X- and Y-axis carriages, respectively, the X- and Y-axis coordinates of the position of the gun may be displayed continuously to an accuracy of one ten-thousandth of an inch, for example. These numbers may be fed to a computer and recorded in a suitable memory circuit and then processed so that a straight line interpolation of the path may be made to some preset deviational tolerance. This latter information may be retained in a magnetic memory and used to control the position of a second electron beam welding gun which may be installed behind the gun which is utilized to detect and follow the seam by making proper allowance for the difference in position of the two guns. Or the information in the computer memory may be utilized to direct the same gun which has been used to track the seam so that during the welding operation it will follow that seam as it is directed by the information which has been generated by the computer.

While a certain preferred embodiment of the invention has been specifically disclosed, it is understood that the invention is not limited thereto as many variations will be readily apparent to those skilled in the art and the invention is to be given its broadest possible interpretation within the terms of the following claims.

What I claim is:

1. A method for controlling the motion of an electron gun so that the beam generated by said gun follows, at a constant tangential velocity, the seam along which two parts to be welded adjoin, comprising the steps of;

generating, accelerating and focusing an electron beam;

directing the beam so that in its at rest position it impinges upon the work at a point close to the said seam;

deflecting the beam, so that it follows a circular path which crosses the said seam twice during each revolution of said beam, by applying two periodically varying magnetic or electrostatic forces normal to said beam along mutually perpendicular axes, one of said forces directed along one of said axes and varying in proportion to sine $\omega t$ and a second of said forces directed along the other of said axes and varying in proportion to cosine $\omega t$;

generating an electric pulse each time the beam crosses the said seam;

supplying the said pulse to a bistable electronic circuit so as to produce at the output of said circuit a periodic alternating rectangular voltage wave which alternates between two voltage levels in synchronism with each successive pulse;

integrating the said rectangular voltage wave, by electronic means, and thus producing a position error signal which represents the deviation of the rest position of the beam from the seam;

multiplying, by electronic means, the said voltage wave by a periodic voltage varying as the sine $\omega t$ and simultaneously multiplying, by other electronic means, the said voltage wave by a periodic voltage varying as the cosine $\omega t$, so as to obtain separate product voltages which represent respectively the cosine and sine of an angle $\theta$ between the seam and the first of aforesaid axes;

multiplying, by electronic means, the said position error signal respectively by separate voltages representing the said sine $\theta$ and cosine $\theta$ so as to obtain the position error components with respect to the aforesaid axes;

multiplying, by electronic means, a voltage which represents a desired tangential velocity for the beam respectively by the separate voltages representing the sine and cosine of the angle $\theta$ between the seam and the said axis so as to obtain separate voltages representing the components of the said tangential velocity along each of the said axes;

summing the voltages representing the positional error and the component of the tangential velocity along one of said axes, by electronic means, and summing the voltages representing the positional error and the component of tangential velocity along the second of said axes, by other electronic means, so as to obtain separate control signals and; feeding the said signals to a pair of electronic servo systems which drive the gun along the two axes so as to cause the gun to move at a fixed tangential velocity along a path parallel to the said seam 2. A method for controlling the motion of an electron beam gun, as in claim 1, in which the aforesaid pulses are generated by the steps of collecting secondary and reflected electrons generated by the beam impinging upon the work, directing the said electrons to a pulse amplifier and shaping circuit, causing the variations in secondary electrons collected to be amplified and generating a pulse of fixed amplitude and pulse length whenever there is an abrupt reduction in secondary electron current due to the electron beam crossing the seam.

3. A method in accordance with claim 1 which includes the additional step of supplying substitute pulses to a flip-flop gate in the event that one of the aforesaid first mentioned pulses is not generated by the action of the beam crossing the seam.

4. A method in accordance with claim 1 including the additional step of locking out extraneous and noise pulses so as to prevent them from triggering a bi-stable flip-flop gate in said bi-stable electronic circuit.

5. A method in accordance with claim 1 including the additional step of determining the direction of travel of the electron gun with respect to the seam and maintaining the motion along the seam in the desired direction.

6. A method in accordance with claim 1 including the additional step of dynamically recording the coordinates along the said axes of a series of points along the said seam, with respect to a given reference point on the work.

* * * * *